United States Patent [19]

Boggiano

[11] Patent Number: 4,680,192

[45] Date of Patent: * Jul. 14, 1987

[54] APPARATUS AND METHOD FOR PROCESSING FAVA BEANS HAVING PODS AND SEEDS

[76] Inventor: John Boggiano, 7899 DeMartini La., Linden, Calif. 95236

[*] Notice: The portion of the term of this patent subsequent to Nov. 11, 2003 has been disclaimed.

[21] Appl. No.: 865,885

[22] Filed: May 21, 1986

Related U.S. Application Data

[63] Continuation-in-part of Ser. No. 725,004, Apr. 19, 1985, Pat. No. 4,621,572.

[51] Int. Cl.⁴ .............................................. A23N 5/00
[52] U.S. Cl. ..................................... 426/482; 99/574; 99/576; 99/582; 426/518
[58] Field of Search ....................... 426/481, 482, 518; 99/588, 589, 582, 574, 575, 541

[56] References Cited

U.S. PATENT DOCUMENTS 2,344,711  3/1944  McNutt et al. ........................ 99/582
3,695,273 10/1972  Taylor ................................... 99/574

*Primary Examiner*—George Yeung
*Attorney, Agent, or Firm*—Phillips, Moore, Lempio & Finley

[57] ABSTRACT

The pods of fava beans are cut and then squeezed to separate the seeds from the pods of the beans. The beans are fed vertically and downwardly between a pair of converging conveyor belts that frictionally engage and move the beans along a path. A stationary spring-loaded and depth gauged cutting blade is disposed in the path to cut the pods whereafter the belts function to squeeze the pods to force the beans therefrom.

18 Claims, 7 Drawing Figures

APPARATUS AND METHOD FOR PROCESSING FAVA BEANS HAVING PODS AND SEEDS

CROSS REFERENCE TO RELATED APPLICATION

This application is a continuation-in-part of U.S. patent application Ser. No. 725,004, filed on Apr. 19, 1985, now U.S. Pat. No. 4,621,572.

TECHNICAL FIELD

This invention relates generally to an apparatus and method for processing beans or the like and more particularly to the cutting of the pods of fava beans to facilitate separation of the seeds of the beans from the pods.

Background Art

The commercial marketability of various types of podded beans largely depends on the ability of a processor to expeditiously and economically separate the seeds from the pods thereof. The inability to provide an apparatus and method for efficiently effecting such separation is particularly apparent in respect to fava beans which have a relatively tough pod. In conventional practice, the pods are manually removed by the use of knives or the like which is time consuming and gives rise to uneconomically high processing costs.

DISCLOSURE OF INVENTION

The apparatus and method of the present invention overcome the above, briefly described problems by expeditiously, efficiently and economically separating the seeds from the pods of fava beans or the like without damaging the seeds.

The apparatus comprises first means for moving the beans along a path, second means for cutting the pods during their movement along the path to facilitate separation of the seeds from the pods, and third means for squeezing the pods to force the seeds out of the pods.

BRIEF DESCRIPTION OF THE DRAWINGS

Other objects and advantages of this invention will become apparent from the following description and accompanying drawings wherein.

BEST MODE OF CARRYING OUT THE INVENTION GENERAL DESCRIPTION

Figure 1:
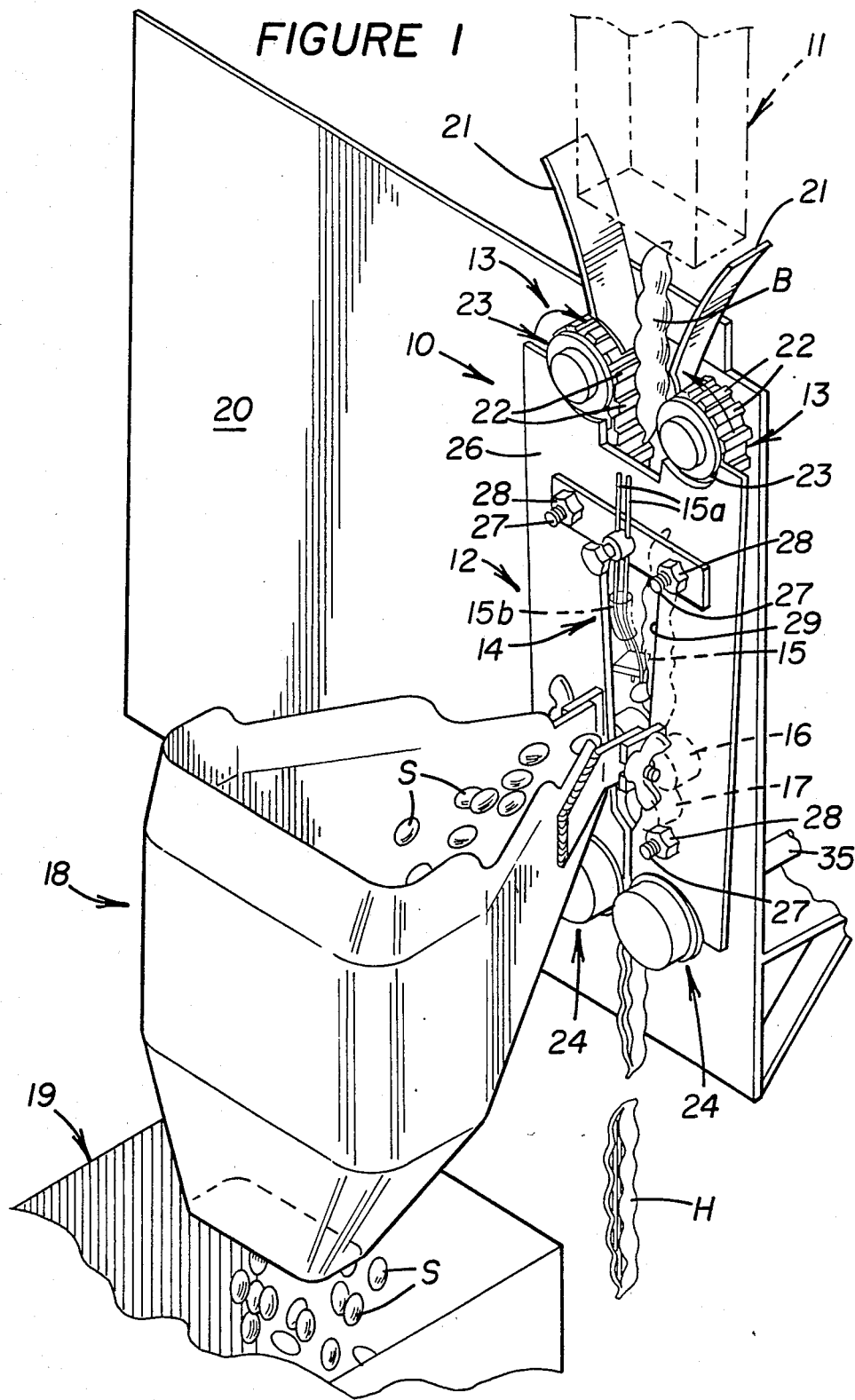
FIG. 1 is the frontal isometric view of an apparatus for processing fava beans.

FIG. 1 illustrates an apparatus 10 for processing fava beans B or the like comprising a hopper 11, shown in phantom lines, for delivering the fava beans to an upstream end of a cutting and separation assembly 12. As more clearly shown in FIG. 2, assembly 12 comprises a pair of endless gear belts 13 arranged generally vertically to converge towards each other in a downward direction to transport the fava beans along a path P therebetween. A cutting assembly 14 has a razor blade 15 or other suitable cutter mounted in a spring-loaded and depth gauged fixed position on the apparatus to project into path P.

The blade functions to cut or slice a pod or husk H of each fava bean B prior to further descent of the fava bean downwardly through the assembly. The gear belts frictionally grip the bean therebetween during the cutting step of the process whereafter the beans are squeezed between the belts by a first set of squeeze or cam rollers 16 to squeeze-out and eject seeds S from pods H. A second set of squeeze or cam rollers 17 are mounted downstream of the first set of cam rollers and function to complete the squeezing of the husks to insure that all of the seeds are ejected therefrom.

As described above, the fava bean has a relatively tough pod that must be sliced before the seeds can be separated from the pod. Applicant's hereinafter described apparatus and method will effect such separation expeditiously, efficiently and economically without damaging the seeds. As further shown in FIG. 1, the seeds may be ejected into a chute 18 for storage in a container 19 whereas spent pods H are free to drop under the influence of gravity into a container (not shown) for disposal purposes.

DETAILED DESCRIPTION

Figure 3:
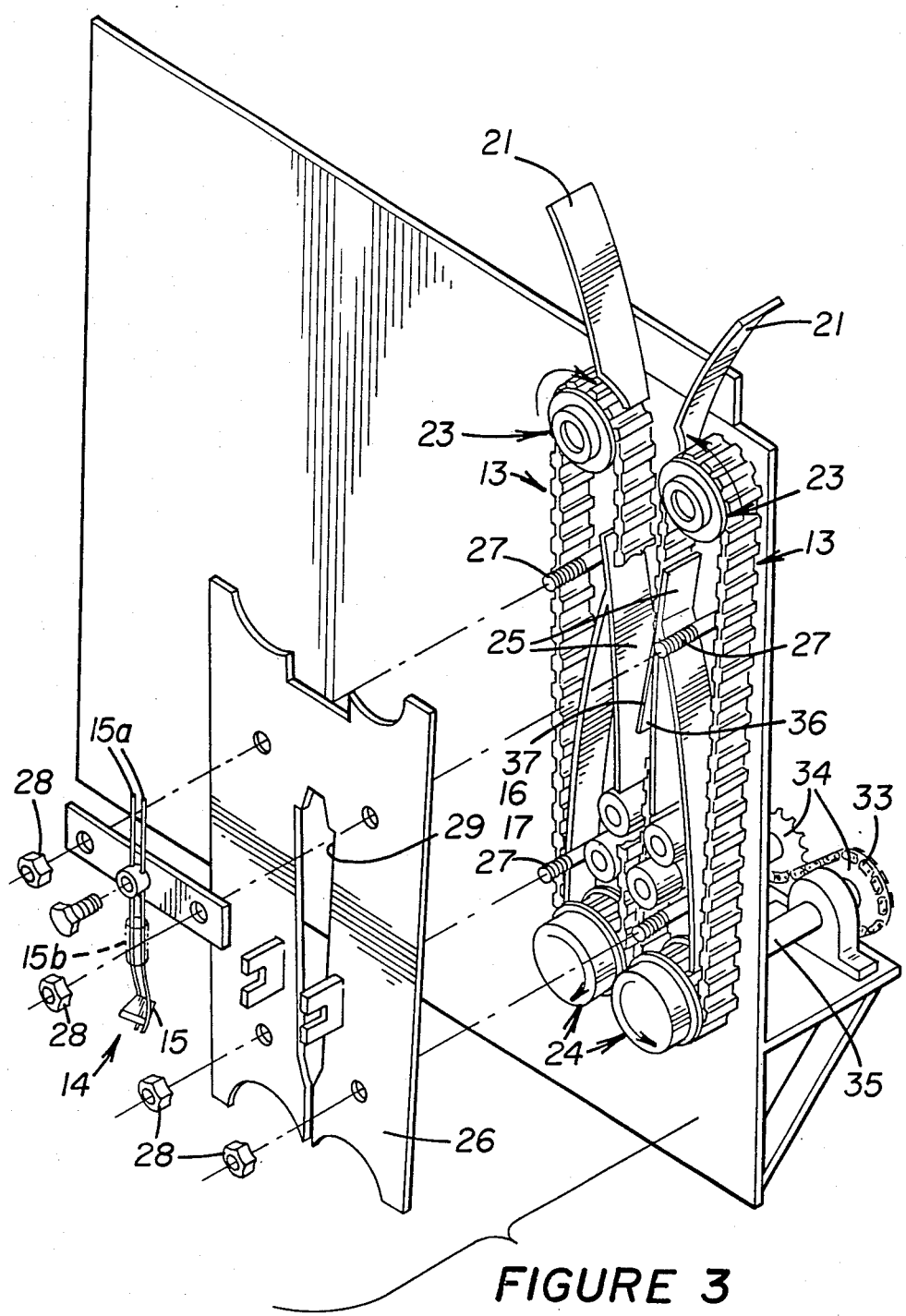
FIG. 3 is an exploded view of component parts of the apparatus.

Referring to FIGS. 1 and 3, apparatus 10 is mounted on a fixed base or bed plate 20 having a pair of downwardly converging fixed guides 21 secured thereon to receive fava beans B from hopper 11 and drop them between belts 13. Each belt 13 can be composed of a suitable plastic material or a standard fabric or cord (nylon or steel) impregnated and bonded by vulcanized rubber compounds to form a plurality of longitudinally and evenly spaced inner and outer teeth 22 thereon. As described more fully hereinafter, the outer teeth, when facing path P, function to firmly frictionally grip (but not damage) the pods of the fava beans during their descent through assembly 12 and, cooperating with cam rollers 16 and 17, will uniformly apply increasing compressive forces to either sides of the beans to eject seeds S without damaging them.

Figure 2:
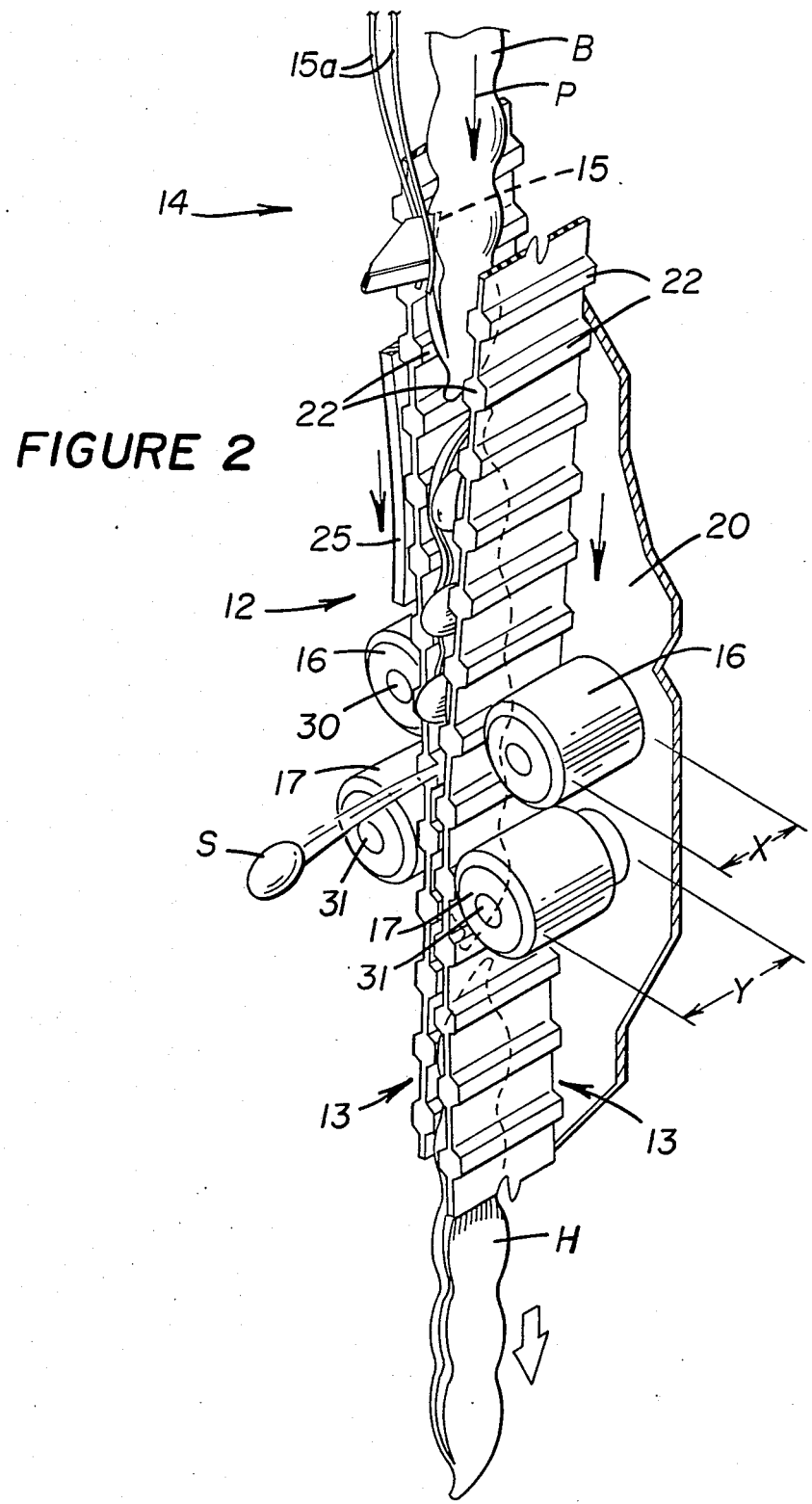
FIG. 2 is an enlarged isometric view of a cutting and separation assembly mounted in the apparatus to cut the pods of the fava beans and to separate their seeds from the pods.

As shown in FIG. 2, blade 15 is epoxied or otherwise suitably secured between the lower ends of a pair of fixed spring steel wires 15a. The wires are suitably crimped to engage and follow any irregular centour of the pod of a bean, due to their inherent resilient flexing action, to maintain the appropriate cutting pressure on the bean. The cutting edge of the blade protrudes beyond the undersides of the wires at a distance slightly less than the thickness of the pod. This arrangement will function to automatically control and gauge the depth of the cut into the pod to insure that the seeds are not cut or otherwise damaged. A vinyl cover 15b or the like can be mounted on the wires for protection purposes, if so desired (FIGS. 1 and 3).

Each gear belt 13 is mounted on an upper idler sprocket 23 and a lower drive sprocket 24. A belt guide and backup member 25 is fixedly secured on bed plate 20 to press against the backside of each gear belt to define the desired converging relationship therebetween. Such converging relationship will effect the gripping function through cutting assembly 15 and ready the cut beans for further travel through the squeezing assembly, including cam rollers 16 and 17. As shown in FIGS. 2 and 3, members 25 are arranged to define a downwardly converging channel between belts 13 that is relatively wide at its top and gradually narrows at its bottom whereat seeds 5 are forced to initiate their transverse movement out of pod H as the bean approaches rollers 16 (FIG. 2).

A cover plate and belt guard 26 is secured on bedplate 20 by a plurality of machine bolts 27 and nuts 28 to at least substantially cover and protect the gear belts. A centrally disposed opening 29 is formed through the cover plate to accommodate cutter 15 and to provide visual inspection during the processing of the beans. As shown in FIG. 2, first set of cam rollers 16 are each rotatably mounted on a shaft 30, secured on bedplate 20, and have a frontal edge positioned at a distance "X" from the bedplate that is less than the width of belt 13. A frontal edge of each cam roller 17, rotatably mounted on a shaft 31, is disposed at a distance "Y" that is substantially aligned with the outer edge of belt 13 with the distance "Y" being greater than distance "X". In addition, rollers 16 are spaced apart from each other at a distance, transverse to path P, that is greater than the separation distance between rollers 17.

This "staggered" and separation relationship between the first and second sets of cam rollers will insure that the first set of cam rollers will initiate the squeezing function for ejecting seeds S (approximately ½ of the bean is squeezed). The second set of cam rollers will function to completely squeeze the bean, to insure ejection of all of the seeds. Belt guides 25 can be suitably positioned and configured, relative to path P and against belts 13, to further aid in initiating the squeezing function, as shown in FIG. 2.

Figure 5:
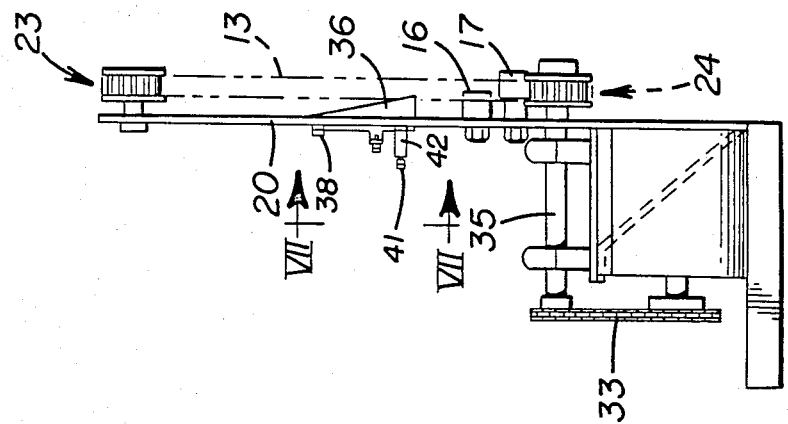
FIG. 5 is an end elevational view of the apparatus and drive system, taken in the direction of arrows V—V in FIG. 4.
Figure 4:
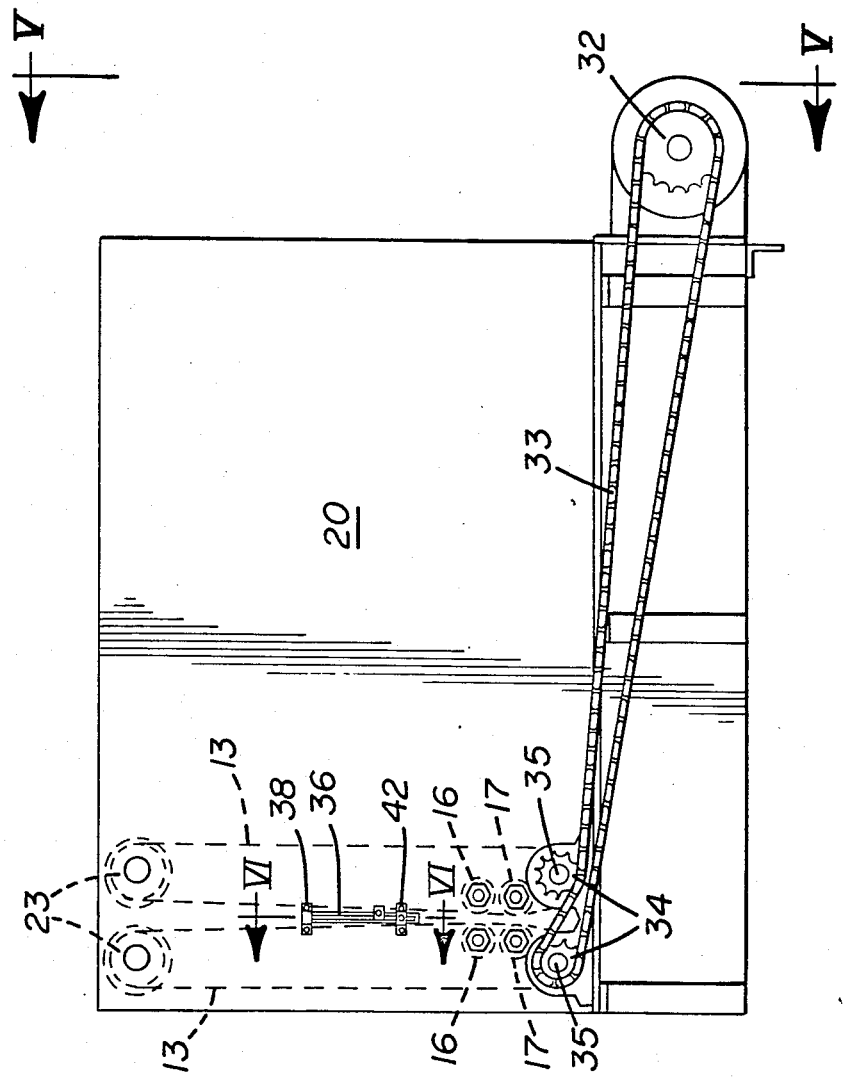
FIG. 4 is a backside elevational view of the apparatus, showing a drive system therefor.

FIGS. 4 and 5 are backside and end elevational views of vertically disposed bed plate 20 and further show a drive system for gear belts 13. In particular, a motor-driven drive sprocket 32 has a drive chain 33 entrained thereover to drive a pair of driven sprockets 34, each connected to a respective gear belt drive sprocket 24 (FIG. 3) by a shaft 35. The entrainment of the chain over sprockets 34 in the manner illustrated in FIG. 4 insures that gear belts 13 will be matched in speed and move in the desired opposite directions for bean processing purposes.

Figures 6, 7:
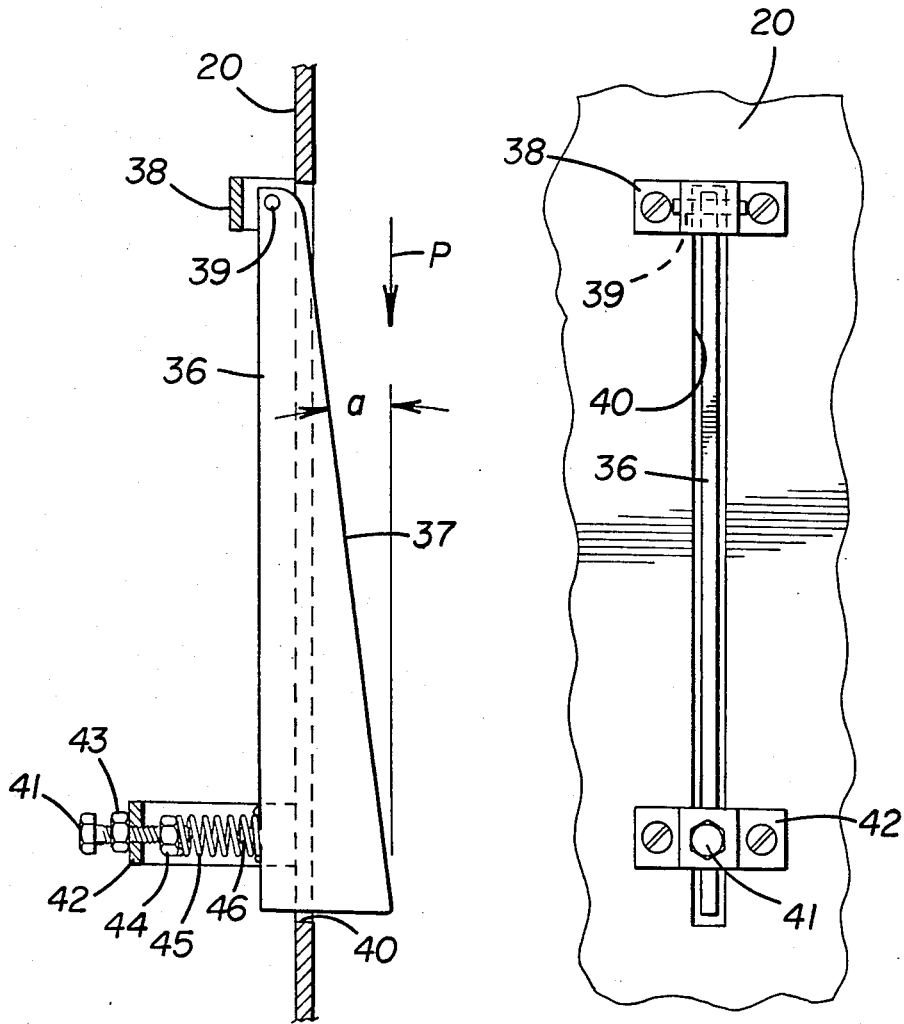
FIGS. 6 and 7 are views taken in the direction of arrows VI—VI and VII—VII in FIGS. 4 and 5, respectively.

As shown in FIGS. 3-7, a generally triangular and vertically disposed plate 36 can be used to press against the backsides of beans B to aid members 25 in pushing seeds S out of pods H, after the pods have been cut and before descent of the beans through rollers 16, 17. Wedge-shaped plate 36 is mounted on bed plate 20, vertically between blade 15 and the rollers. FIGS. 6 and 7 illustrate an example of an adjustable mounting arrangement for plate 36 whereby the plate can be adjusted to define a variable acute angle "a" between a frontal edge 37 of the plate and path P.

Such adjustment may be used to vary angle "a" to accomodate beans of varied circumference. For example, one batch of beans may have relatively small circumferences requiring a larger angle "a" than is required for a batch of beans having larger circumferences. If this angle is too large for the larger circumferenced beans, the plate may tend to push the beans out from between the belts.

Plate 36 is pivotally mounted at its upper, narrow end on a bracket 38, secured on the backside of bed plate 20, by a pin 39. Plate 36 projects forwardly through a vertically disposed and elongated slot 40, formed through bed plate 20, to selectively permit changes in angle "a" and thus the inclination of frontal edge 37 in its downwardly diverging relationship relative to path P and the backsides of beans B.

The adjustment means for selectively adjusting angle "a" and the extent by which the lower, wide end of plate 36 projects through slot 40 comprises a set screw 41 threadably mounted on a second bracket 42, also secured on the backside of bed plate 20. A lock nut 43 can be used to releasably fix the axial position of the set screw on bracket 42 and thus angle "a".

A second nut 44 (or standard cup-shaped spring retainer) is epoxied or otherwise suitably secured on a distal end of set screw 41. A compression coil spring 45 is preferably mounted between nut 44 and a mounting pin or post 46, secured on a backside of plate 36, to constantly apply a predetermined biasing force on the plate and towards path P. The "spring-loading" of the plate in this manner will compensate for irregularities in the sizes and shapes of the beans.

Alternatively, plate 36 can be bolted directly to bed plate 36 in a fixed manner. A selected number of plates, having varied wedge-shapes and varied defined angles of inclination "a", could be kept on hand by the operator. The plate can be replaced as the need arises to accomodate different batches of beans having varied circumferences, i.e., a less pronounced wedge-shape and angle "a" for beans having relatively smaller circumferences.

I claim:

1. An apparatus for processing beans having pods and seeds retained in said pods, said apparatus comprising
   first means for moving said beans along an at least substantially vertical path comprising a pair of endless belts extending in the direction of said path and positioned adjacent to each other to receive said beans therebetween,
   second means, including a stationary cutting blade positioned to extend into said path, for cutting said pods at a controlled depth during movement of said beans along said path with said beans being frictionally gripped between said belts to facilitate separation of said seeds from said pods, and
   third means for squeezing said pods to force said seeds out of said pods.

2. The apparatus of claim 1 wherein said belts are arranged at least generally vertically and converge towards each other in a downward direction along said path.

3. The apparatus of claim 2 further comprising guide means engaging backsides of said belts for urging them into their converging relationship and into frictional engagement with said beans.

4. The apparatus of claim 3 wherein said guide means comprises a fixed guide member mounted adjacent a backside of each of said belts.

5. The apparatus of claim 2 wherein each of said belts has a plurality of longitudinally spaced teeth formed thereon to face said path and to extend transversely thereof.

6. The apparatus of claim 1 wherein said third means comprises at least one squeezing means positioned at a backside of each of said belts for urging said belts towards each other to squeeze said pods.

7. The apparatus of claim 6 wherein said squeezing means comprises a first pair of cam rollers rotatably mounted on a bedplate to each engage a backside of a respective one of said belts and a second pair of cam rollers positioned downstream from said first pair of cam rollers in the direction of said path to each engage a backside of a respective one of said belts.

8. The apparatus of claim 7 wherein a frontal edge of each of said first pair of cam rollers is disposed between the width of each of said belts and wherein each of said second pair of cam rollers extends substantially fully across the width of each of said belts to position an outer edge thereof adjacent to an outer edge of such belt.

9. The apparatus of claim 7 wherein said first pair of cam rollers are spaced apart from each other at a distance, transverse to said path, greater than a separation distance between said second pair of rollers.

10. The apparatus of claim 2 wherein each of said belts is entrained over a pair of vertically spaced sprockets and further comprising drive means for rotating at least one of said sprockets.

11. The apparatus of claim 2 further comprising a bed plate having said belts mounted thereon and a cover plate mounted on said bed plate in at least substantial covering relationship over said belts, said cover plate having a centrally disposed opening formed therethrough and wherein said cutting means comprises a cutting assembly mounted on said cover plate and having a spring-loaded and depth gauged fixed blade extending through said opening and disposed in said path for cutting said pods.

12. The apparatus of claim 1 further comprising means for pressing against the backsides of said beans to aid in forcing said seeds out of said pods.

13. The apparatus of claim 12 wherein said last-mentioned means comprises a vertically disposed plate having a frontal edge disposed in downwardly diverging relationship relative to said path to define an acute angle therebetween and means for selectively varying said acute angle.

14. The apparatus of claim 13 further comprising spring means for applying a biasing force to said plate and towards said path to compensate for irregularities in said beans.

15. A method for processing fava beans having pods and seeds retained in said pods, said method comprising the steps of moving said beans along an at least substantially vertical path between a pair of endless belts extending in the direction of said path, cutting said pods at a controlled depth with a stationary blade during the movement of said beans along said path with said beans being frictionally gripped between said belts to facilitate separation of said seeds from said pods, and squeezing said pods to force said seeds out of said pods.

16. The method of claim 15 wherein said moving step comprises frictionally engaging said beans between said pair of endless belts extending in the direction of said path.

17. The method of claim 15 wherein said moving step comprises moving said beans vertically downwardly.

18. The method of claim 16 further comprising applying engaging forces to backsides of said belts for urging them into a downwardly converging relationship and into frictional engagement with said beans.

* * * * *